UNITED STATES PATENT OFFICE.

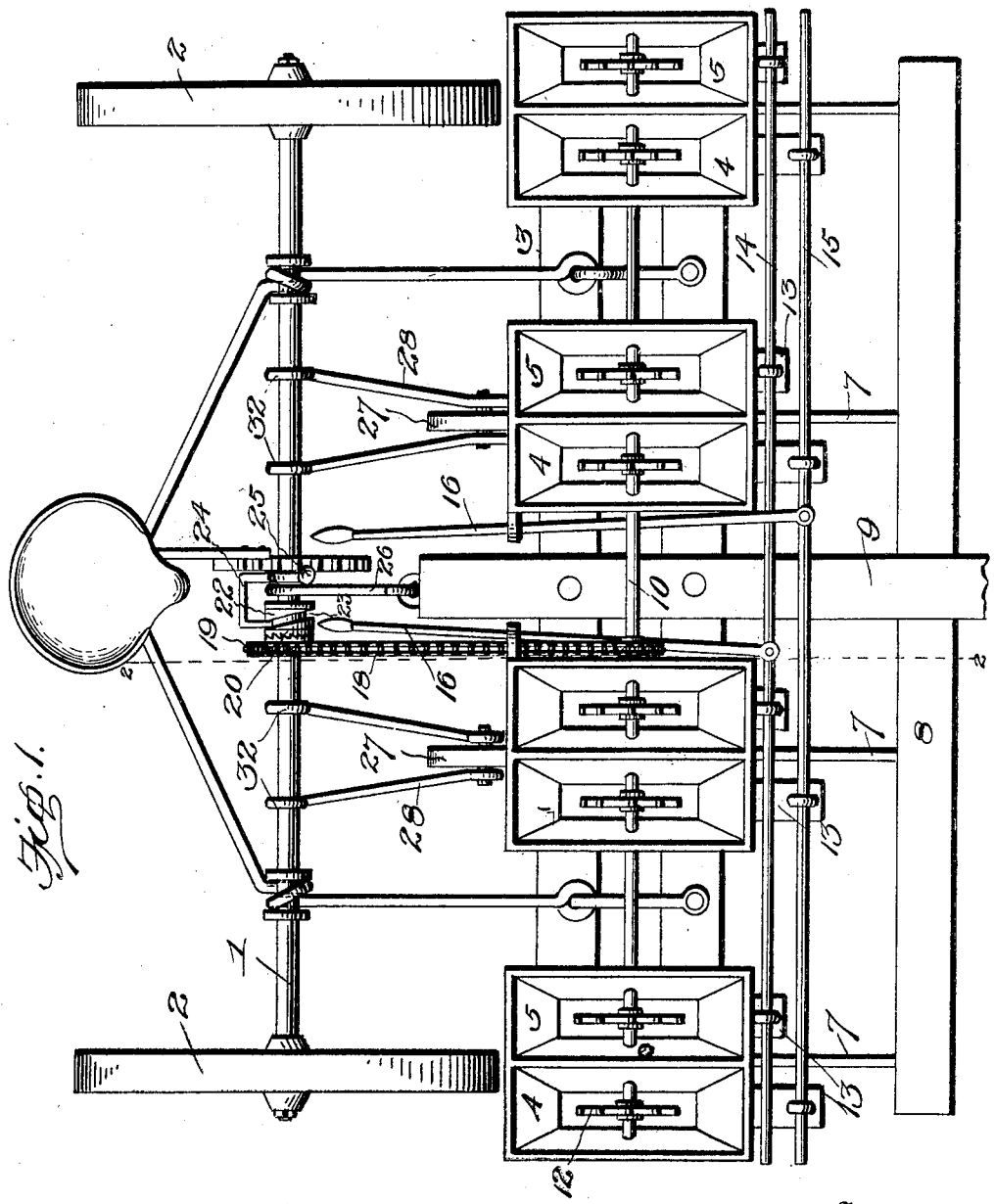

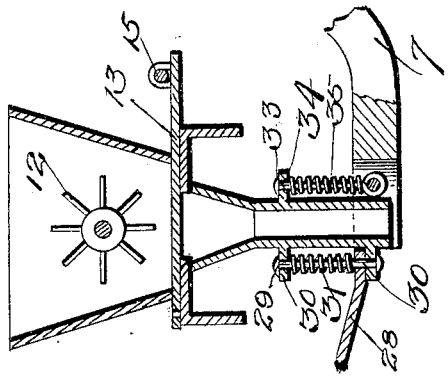
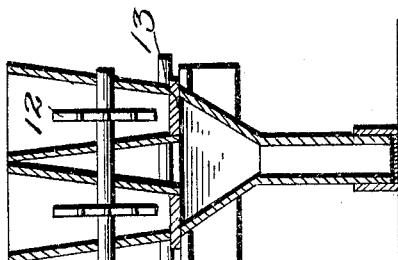
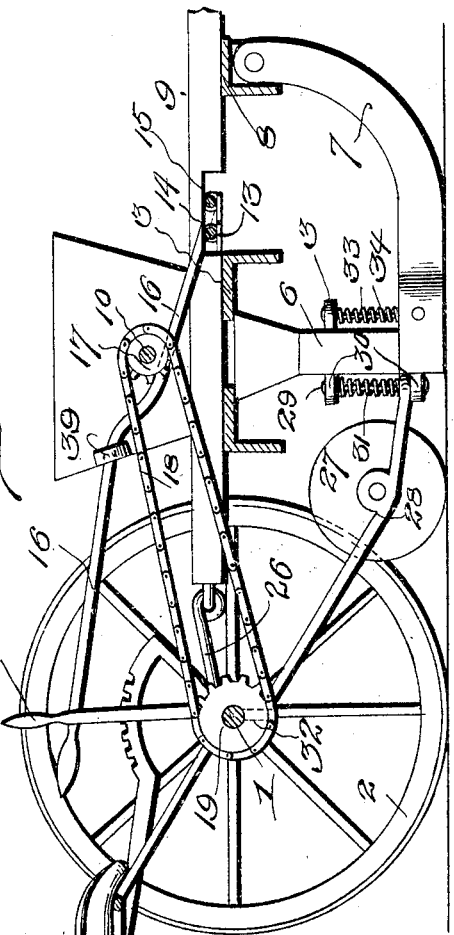
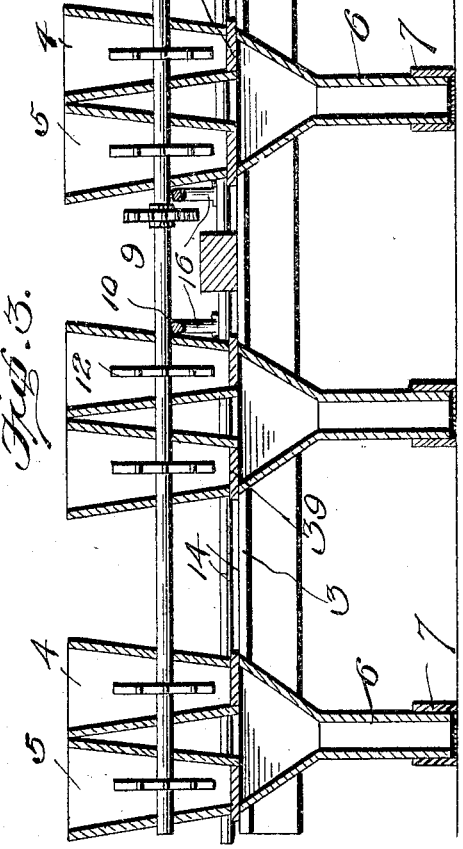

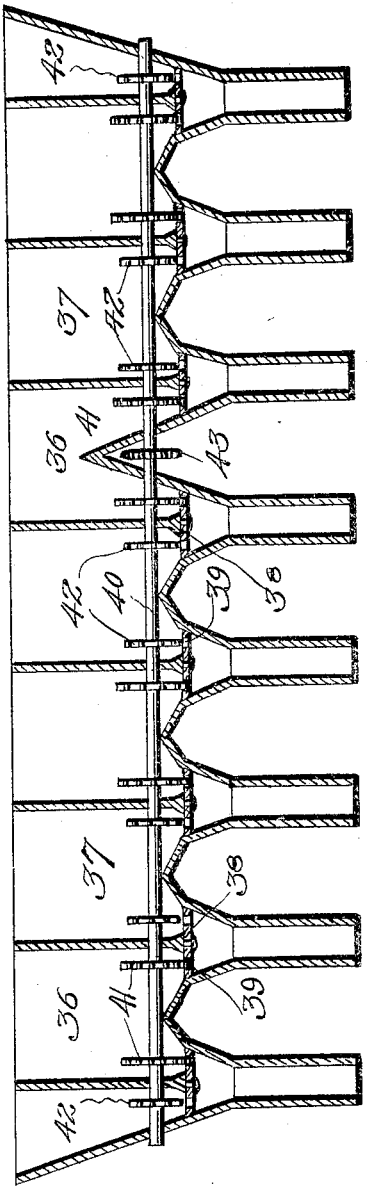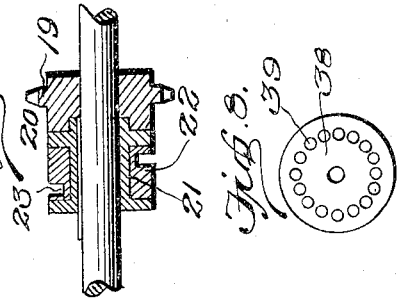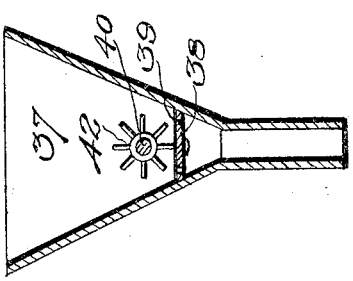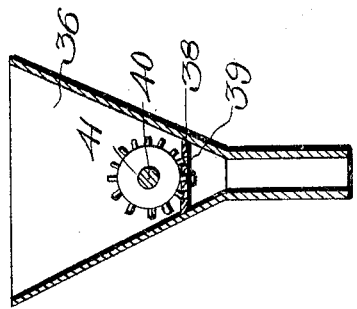

JAMES M. PEERSON, OF FLORENCE, ALABAMA.

COMBINED FERTILIZER-DISTRIBUTER AND GRAIN-DRILL.

No. 803,130.          Specification of Letters Patent.          Patented Oct. 31, 1905.

Application filed April 20, 1905. Serial No. 256,575.

*To all whom it may concern:*

Be it known that I, JAMES M. PEERSON, a citizen of the United States, residing at Florence, in the county of Lauderdale and State of Alabama, have invented certain new and useful Improvements in a Combined Fertilizer-Distributer and Grain-Drill; and I do declare the following to be a full, clear, and exact description of the invention, such as will enable others skilled in the art to which it appertains to make and use the same.

This invention relates to improvements in fertilizer-distributers and grain-drills.

The object of the invention is to provide a machine of this character in which the feeding mechanism for both the grain and fertilizer hoppers is operated by a common shaft, means being provided for regulating the feed of said hoppers and for entirely cutting off the feed of either the seed or fertilizer hopper while in motion as well as when still.

A further object is to provide means for regulating the depth at which the seed is planted and means for throwing the planting mechanism out of gear.

With these and other objects in view the invention consists of certain novel features of construction, combination, and arrangement of parts, as will be hereinafter described and claimed.

In the accompanying drawings, Figure 1 is a plan view of a combined fertilizer-distributer and drill constructed in accordance with the invention. Fig. 2 is a vertical longitudinal sectional view of the same, taken on the line 2 2 of Fig. 1. Fig. 3 is a vertical transverse sectional view, taken through the hoppers on a line with the operating-shaft, of the feed mechanism. Fig. 4 is a detail vertical longitudinal sectional view through one of the seed-hoppers. Fig. 5 is a view similar to Fig. 3, showing a modified construction of hoppers and feed mechanism. Fig. 6 is a vertical transverse sectional view through one of the seed-hoppers shown in Fig. 5, showing the feeding mechanism therein. Fig. 7 is a similar view through one of the fertilizer-hoppers. Fig. 8 is a plan view of one of the seed-plates shown in Figs. 5, 6, and 7, and Fig. 9 is a detail sectional view of the clutch for throwing the driving mechanism of the feed-shaft out of gear.

Referring more particularly to the drawings, 1 denotes the axle of a machine. 2 denotes the supporting-wheels. 3 denotes the hopper-frame. 4 denotes the seed-hoppers. 5 denotes the fertilizer-hoppers, and 6 denotes the combined grain and fertilizer tubes, at the lower end of which are arranged runners or furrow-openers 7. The upper ends of these runners are pivotally connected to the cross-bar 8, secured to the tongue 9, the inner end of which is secured to the hopper-frame 3.

The seed and fertilizer hoppers 4 and 5 are preferably arranged in pairs, as shown in Figs. 1 and 3 of the drawings, and through said pairs of hoppers extends a shaft 10.

In each of the hoppers is arranged an agitator-wheel 12, whereby the seed or fertilizer contained in said hoppers is fed to the discharge-opening in the bottom of the same and into the tubes 6.

In order that the size of the discharge-openings in the lower end of the hoppers may be varied to regulate the feed of the seed and fertilizer therefrom, said hoppers are provided with valve-plates 13, said plates being pivotally connected at one end of the hopper-frame 3 and connected at their opposite ends to shifting-rods 14 and 15, to which are connected the ends of shifting-levers 16. The valve-plates 13 slide laterally from under the openings in the hoppers, one end of each of said plates being pivoted and the opposite end laterally movable by the levers 16. Said levers extend to within convenient reach of the operator or driver of the machine and which when actuated will shift the rods 14 and 15 to move the valve-plates 13, thus opening or closing the discharge-openings of the hoppers to a greater or less degree.

The shaft 10 is provided with a sprocket gear-wheel 17, which is connected by a sprocket-chain 18 to a sprocket-wheel 19, loosely mounted on the axle or shaft 1 of the machine. The gear-wheel 19 is provided with one member of a clutch device 20, the opposite member of which is slidably mounted upon the shaft 1 to turn therewith and is provided with an annular channel or recess 21, in which is arranged a loose sleeve or collar 22. In the sleeve or collar 22 is provided an annular cam groove or channel 23, with which is adapted to be engaged the right-angularly bent end 24 of a combined shifting and lifting lever 25. Upon this lever 25 is formed a right-angularly projecting arm 26, sleeved at one end upon the axle 1, the opposite end of which is connected to the rear end of the tongue 9 and which when operated is adapted to lift the hopper-frame and the parts connected thereto out of engagement with the ground and which when so operated is adapted to disengage the member of the clutch 20 to which the same is connected from the member of the clutch connected to the sprocket-wheel 19, thereby throwing the agitator-shaft of the feeding mechanism out of gear, so that when the hopper-frame and the drilling-tube are in an elevated position the feeding mechanism will not be operated.

The seeds deposited through the end tubes 6 into the furrows opened by the end runners 7 are covered by the supporting-wheels of the machine which are arranged to run directly in the path of said furrow. The seeds deposited by the intermediate tubes into the furrows opened by the intermediate runners are covered by covering-wheels 27, journaled in frames 28, the lower ends of which are slidably mounted upon vertically-disposed rods 29, fixed in laterally-projecting brackets 30, secured to the rear side of the tubes 6. On the rods 29 are arranged coil-springs 31, which are adapted to normally hold the lower end of the wheel-frames 28 downwardly, thus forcing the wheels 27 into engagement with the soil. The opposite or upper ends of the frames 28 are bent around the axle or shaft 1, said axle or shaft being free to rotate in the loops 32 in said frames. By thus mounting the covering-wheels 27 the same are permitted to move over stones or obstructions without danger of breaking any of the parts of the machine.

The lower bifurcated ends of the runners 7, where the same engage the lower end of the tubes 6, are connected to said tubes by means of a vertically-disposed rod 33. This rod passes upwardly through a guide-bracket 34, and on said rods between the brackets 34 and the lower end of the runners is arranged a coil-spring 35. By this arrangement the lower end of the runners are yieldingly connected to the tubes to permit the runners to pass freely over obstructions which might be in their path of movement.

In Figs. 5, 6, and 7 is shown a modified construction and arrangement of the feeding mechanism, the arrangement shown in these figures being particularly adapted for the regular feeding or checking of the seed contained in the hoppers. The hoppers in these figures are shown as arranged differently from the hoppers shown in the first figures of the drawings. In this instance the hoppers, except those at the ends of the machine, are shown double—that is to say, each seed-hopper 36 and each fertilizer-hopper 37 is arranged to serve two feed-tubes. At the upper end of each of said tubes is arranged a rotatably-mounted cylindrical feed-plate 38, in which is formed an annular series of feed-apertures 39. Within the hoppers 36 and 37 is arranged a centrally-disposed feed-shaft 40, on which is arranged a series of tooth-wheels 41, said wheels being disposed in pairs and arranged in each of the seed-hoppers 36. The teeth on the wheels 41 are adapted to engage feed-apertures 39 in the seed-plates 38, so that when the shaft 40 is turned the teeth on the wheels 41 will force the seed through the feed-openings in the seed-plates 38 and will also revolve said plates, thus providing a regular and positive feed from the seed-hoppers. On the shaft 40 is also arranged pairs of agitator-wheels 42, said wheels being arranged in each of the fertilizer-hoppers immediately above the apertured seed-plates and by means of the same the fertilizer is forced through the apertured plates into the feed-tube by which it is discharged, together with the seed, into the furrows opened by the runners of the machine. The shaft 40 is provided with a sprocket-wheel 43, connected to the axle of the machine by a sprocket-chain in a similar manner as hereinbefore described in connection with shaft 10.

While I have shown and described the hoppers arranged for planting and fertilizing four and eight rows at a time, it is obvious that the same may be used in connection with a single-row planter, and in place of the furrow-opening runners 7 I may employ disks or any other forms of furrow-openers and may close said furrows and cover the seed by the use of drags, plows, teeth, blades, or any suitable form of covering devices instead of the wheels, as shown.

While I have shown and described the machine arranged as a combined drill, fertilizer-distributer, and planter, it is obvious that the same may be employed simply as a drill by supplying all the hoppers with seed or in like manner the machine may be employed simply as a fertilizer-distributer by supplying the hoppers with fertilizer only.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a combined drill, fertilizer-distributer and planter, the combination with the axle and supporting-wheels, of a hopper-frame hingedly connected to said axle, double hoppers arranged on said frame, feed-tubes connected to each of said hoppers, means for regulating the feed of the seed and fertilizer from said hoppers to the feed-tubes, a feeding mechanism arranged in said hoppers, and means whereby said feeding mechanism is operated, substantially as described.

2. In a combined drill, fertilizer-distributer and planter, the combination with the axle and supporting-wheels, of a hopper-frame hingedly connected to said axle, double hoppers arranged on said frame to contain seed and fertilizer, a seed-feeding mechanism and a fertilizer-operating mechanism arranged on a common operating-shaft, and means whereby said shaft is driven from the axle of the machine, substantially as described.

3. In a combined drill, fertilizer-distributer and planter, the combination with the axle and supporting-wheels, of a hopper-frame hingedly connected to said axle, double hoppers arranged on said frame to contain seed and fertilizer, a feed-shaft passing through said hoppers, feeding-wheels arranged in each of said hoppers and fixed on said shaft, a feed-regulating mechanism arranged in each of said hoppers, means whereby said feed-regulating mechanism for the seed-hoppers and for the fertilizer-hopper is independently controlled, and said feed-shaft is driven from the axle of the machine, the hopper-frame and the parts carried thereby are lifted, and the feed-shaft is simultaneously thrown out of gear, substantially as described.

4. In a combined drill, fertilizer-distributer and planter, the combination with the axle and supporting-wheels, of a hopper-frame hingedly connected to said axle, double hoppers arranged on said frame to contain seed and fertilizer, a feed-shaft passing through said hoppers, feeding-wheels arranged in each of said hoppers and fixed on said shaft, pivotally-mounted valve-plates arranged in the seed and fertilizer compartments of the hoppers, independently-operated shifting-rods connected to said valve-plates, shifting-levers connected to said rods, feed-tubes arranged below said hoppers, furrow-openers yieldingly supported on said frame, and means whereby the seed deposited in said furrow is covered, substantially as described.

5. In a combined drill, fertilizer-distributer and planter, the combination with the axle and supporting-wheels, of a hopper-frame hingedly connected to said axle, double hoppers arranged on said frame to contain seed and fertilizer, a feed-shaft passing through said hoppers, feeding-wheels arranged in each of said hoppers and fixed on said shaft, pivotally-mounted valve-plates arranged in the seed and fertilizer compartments of the hoppers, independently-operated shifting-rods connected to said valve-plates, shifting-levers connected to said rods, feed-tubes arranged below said hoppers, furrow-opening runners pivotally connected at their forward ends to the frame of the machine, means whereby said runners are yieldingly connected at their rear ends to said feed-tubes, covering-wheels, the frames in which said covering-wheels are provided, said wheels being arranged in rear of said feed-tubes, and means whereby said covering-wheels are yieldingly supported on the frame of the machine, substantially as described.

6. In a combined drill, fertilizer-distributer and planter, the combination with the axle and supporting-wheels, of a hopper-frame hingedly connected to said axle, double hoppers arranged on said frame to contain seed and fertilizer, a feed-shaft passing through said hoppers, feeding-wheels arranged in each of said hoppers and fixed on said shaft, pivotally-mounted valve-plates arranged in the seed and fertilizer compartments of the hoppers, independently-operated shifting-rods connected to said valve-plates, shifting-levers connected to said rods, feed-tubes arranged below said hoppers, furrow-opening runners pivotally connected at their forward ends to the frame of the machine, a vertically-disposed rod pivotally connected to the opposite end of said runners, guide-brackets arranged on said feed-tubes to receive said rods, springs arranged on the rod between said brackets and the runners, covering-wheel frames attached to and arranged in rear of said tubes, said frames having their forward ends slidably connected to vertical guide-rods secured to the rear of said feed-tubes, and their rear ends loosely surrounding said axle, springs arranged on the guide-rods to engage the forward ends of said frame, thereby yieldingly forcing the same downward, and covering-wheels journaled in said frames to cover the seed deposited by said feed-tubes, substantially as described.

7. In a combined drill, fertilizer-distributer and planter, the combination with the axle and supporting-wheels, of a hopper-frame hingedly connected to said axle, double hoppers arranged on said frame to contain seed and fertilizer, a feed-shaft passing through said hoppers, feeding-wheels arranged in each of said hoppers and fixed on said shaft, a feed-regulating mechanism arranged in each of said hoppers, means whereby said feed-regulating mechanism for the seed-hoppers and for the fertilizer-hopper is independently controlled, a sprocket-wheel fixed on said feed-shaft, a clutch arranged on said axle, one member of said clutch being loosely and the other slidably mounted on said shaft, said loose member having formed thereon sprocket-teeth, a chain connecting said loose, toothed member of the clutch with the sprocket-wheel of the feed-shaft, a lever mounted on said axle to lift said hopper-frame, and means actuated by said lever to shift the sliding member of the clutch out of engagement with said loose member simultaneously with the lifting of the hopper-frame, substantially as described.

In testimony whereof I have hereunto set my hand in presence of two subscribing witnesses.

JAMES M. PEERSON.

Witnesses:
J. M. EMBREY,
B. J. HURST.